(12) United States Patent
Wolfson

(10) Patent No.: US 10,153,602 B2
(45) Date of Patent: Dec. 11, 2018

(54) ELECTRICAL JUNCTION BOX SYSTEM

(71) Applicant: Jeremy N. Wolfson, Phoenix, AZ (US)

(72) Inventor: Jeremy N. Wolfson, Phoenix, AZ (US)

( * ) Notice: Subject to any disclaimer, the term of this patent is extended or adjusted under 35 U.S.C. 154(b) by 0 days.

(21) Appl. No.: 15/382,529

(22) Filed: Dec. 16, 2016

(65) Prior Publication Data
US 2017/0179657 A1 Jun. 22, 2017

Related U.S. Application Data

(60) Provisional application No. 62/268,021, filed on Dec. 16, 2015.

(51) Int. Cl.
| | | |
|---|---|---|
| *H01R 25/16* | (2006.01) |
| *H01H 3/46* | (2006.01) |
| *H01R 4/02* | (2006.01) |
| *H01R 4/06* | (2006.01) |
| *H01R 4/30* | (2006.01) |
| *H01R 13/11* | (2006.01) |
| *H01R 13/05* | (2006.01) |
| *H01R 24/22* | (2011.01) |
| *H01R 13/66* | (2006.01) |
| *H02G 3/12* | (2006.01) |
| *H02G 3/16* | (2006.01) |

(52) U.S. Cl.
CPC ............ *H01R 25/16* (2013.01); *H01H 3/46* (2013.01); *H01R 4/02* (2013.01); *H01R 4/06* (2013.01); *H01R 4/30* (2013.01); *H01R 13/05* (2013.01); *H01R 13/11* (2013.01); *H01R 13/665* (2013.01); *H01R 24/22* (2013.01); *H02G 3/126* (2013.01); *H02G 3/16* (2013.01)

(58) Field of Classification Search
CPC .......... H02B 1/40; H02G 3/0431; H02G 3/08; H02G 3/10; H02G 3/12; H02G 3/18; H02G 3/14; H02G 3/086; H02G 3/00; H02G 3/02; H01H 9/02; H01H 9/0271; H01H 9/00; H05K 5/00; H05K 5/0026; B60R 16/0239; H01L 23/047
See application file for complete search history.

(56) References Cited

U.S. PATENT DOCUMENTS

| | | | | |
|---|---|---|---|---|
| 3,716,651 A | * | 2/1973 | Werner | ..................... H02G 3/18 174/53 |
| 4,336,418 A | * | 6/1982 | Hoag | ....................... H02G 3/16 174/53 |

(Continued)

*Primary Examiner* — Pete T Lee
(74) *Attorney, Agent, or Firm* — Keith A. Miller

(57) ABSTRACT

The invention described herein is an electrical junction box system according to a preferred embodiment of the present invention where an electrical junction box comprises a housing formed by a pair of side walls, a bottom wall, a top wall, and a rear wall combining to define an open-faced box, where the housing further comprises a plurality of wire attachment terminals, at least one female pin socket, at least one bussbar electrically coupling an upper set of wire attachment terminals to a lower set of wire attachment terminals, and an external securing means allowing the housing secure placement within a recess of a wall. Additionally, an electrical device is structured to removably electrically attach to the housing, the electrical device further comprising at least one male pin extending outward from an inside surface, and an electrical activation means located on an outside surface.

16 Claims, 5 Drawing Sheets

(56) References Cited

U.S. PATENT DOCUMENTS

| | | | | |
|---|---|---|---|---|
| 6,558,190 B1 * | 5/2003 | Pierson, Jr. | ............ | H01R 9/226 439/535 |
| 6,884,111 B2 * | 4/2005 | Gorman | ............... | H01R 31/065 174/53 |
| 2008/0142241 A1 * | 6/2008 | Herth | ....................... | H02G 3/12 174/53 |

* cited by examiner

ELECTRICAL JUNCTION BOX SYSTEM

CROSS-REFERENCE TO RELATED APPLICATIONS

The present application is related to and claims priority from prior provisional application Ser. No. 62/268,021, filed Dec. 16, 2015, entitled "ELECTRICAL BOX SYSTEMS", the contents of all of which are incorporated herein by this reference and are not admitted to be prior art with respect to the present invention by the mention in this cross-reference section.

BACKGROUND OF THE INVENTION

The present invention relates generally to providing an electrical junction box that allows for easier attachment of incoming wires. In addition, the present invention provides an electrical junction box that allows for a neater and more ordered wiring. More particularly this invention relates to providing a system for ordering and wiring an electrical junction box.

In the field of electrical boxes and related wiring in homes, facilitating the connection and switching needed to make home and commercial wiring safe and convenient. As with most adaptations, the uses of these electrical boxes have remained relatively static. Typically, the use of electrical boxes has called for manual wiring and threading, adjusting or passing masses of wires through the boxes. When and where there is a need to troubleshoot the work or connections, the wires are essentially pulled out which adds time as well as other avoidable electrical concerns.

Currently, electrical boxes and devices are essentially hand wired. The electrician pulls various wires into an electrical box and twists many of the wires together using multiple wire nuts and attaches remaining wires to each of the electrical devices (e.g. switches, outlets, etc.). The electrician then shoves the jumbled mass of wires into the electrical box and hopes there's enough room to screw the devices in over the lump of wires in the back of the box. Later, when a circuit needs troubleshooting, an electrician has to pull out the mass of wires and spend a great deal of time figuring out which wire goes where.

The prior art contains several references showing various types of electrical junction boxes. None of the inventions and patents, taken either singly or in combination, is seen to describe the invention as claimed. Thus, a need exists for an electrical junction box system that provides for a neater and more ordered wiring of electrical junction boxes to enhance the safety of the process for the homeowner and provider of electrical services and equipment. The present invention is also an opportunity to retrofit currently used equipment.

BRIEF SUMMARY OF THE INVENTION

The present invention provides an electrical junction box having features to facilitate wiring wherein the connections allow for a preordered linkage of wires reducing or eliminating the need to have a mass of unordered wires in the box. Additionally, the present invention provides for a more customized plan for wiring an electrical junction box by providing electrical bussbars electrically connecting various wire attachment terminals to allow for common electrical circuits. These electrical bussbars are further customizable by allowing a jumper section to be removed where an electrical circuit is to be isolated, or wired to a separate electrical circuit.

In alternate embodiments, the present invention provides a multiple gang electrical junction box wherein a sequencing of wires are ordered to relieve the need for a mass of wires in the electrical junction box and providing for safe wiring of the home or business. In this alternate embodiment, in addition to the electrical bussbars electrically connecting upper and lower wire attachment terminals for common electrical circuits, additional electrical bussbars will electrically connect a set of wire attachment terminals coupled to one switch to a pair of wire attachment terminals coupled to a second switch A primary object and feature of the present invention is to provide a means for reducing or eliminating a fire hazard with the use of electrical boxes where multiple and/or loose wire nuts are present within the electrical boxes.

It is a further object and feature of the present invention to provide such an electrical junction box to reduce the labor cost of wiring and allowing a retrofit ability as needed.

These and other objects and features will become apparent in the following detailed description.

BRIEF DESCRIPTION OF THE DRAWINGS

The particular objects and features of the invention as well as the advantages will become apparent from the following description taken in connection with the accompanying drawings in which.

DETAILED DESCRIPTION OF THE INVENTION

Figure 1:
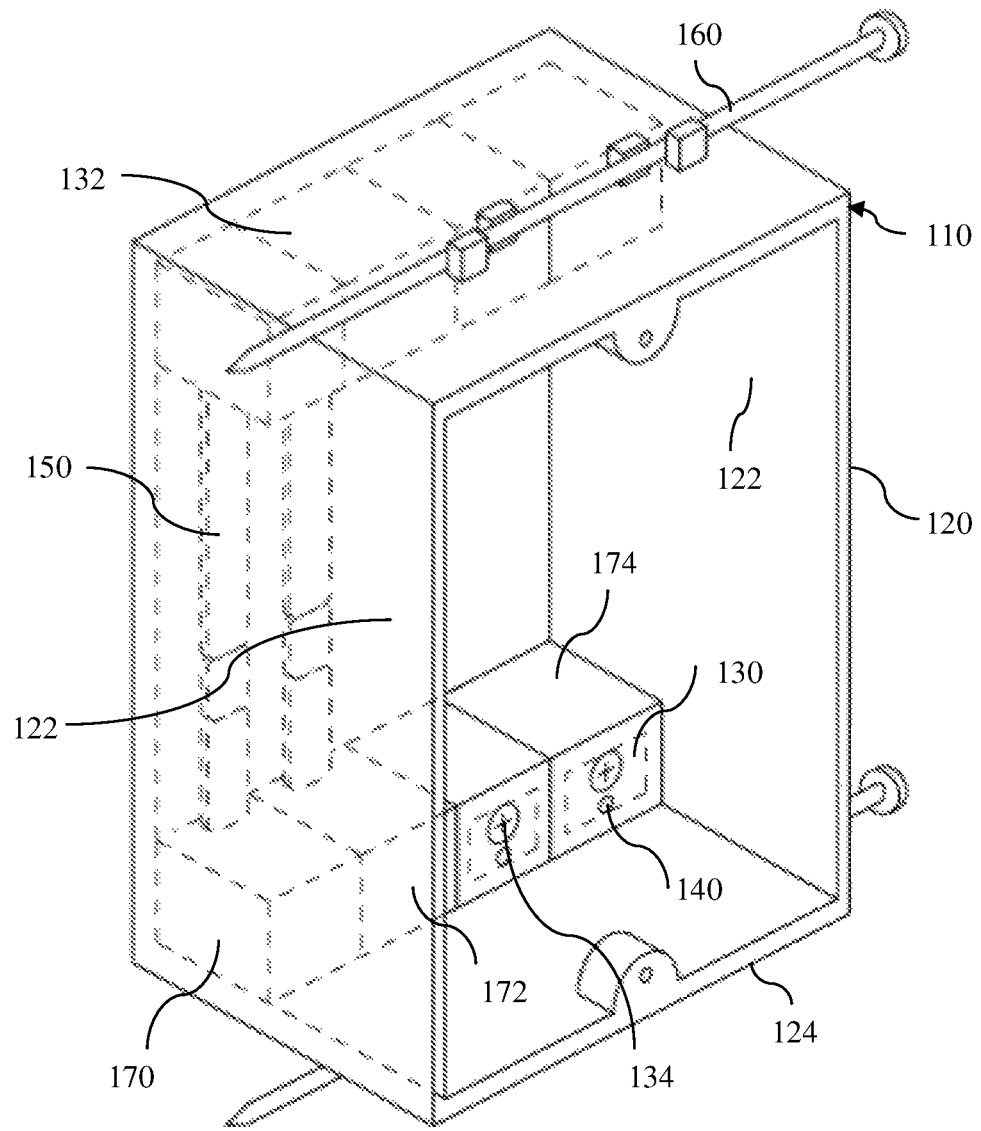
FIG. 1 is a perspective view for an ELECTRICAL JUNCTION BOX SYSTEM according to an embodiment of the present invention.

Referring now to the drawings, FIG. 1 shows an electrical junction box system according to a preferred embodiment of the present invention where an electrical junction box 110 comprises a housing 120 formed by a pair of side walls 122, a bottom wall 124, a top wall 126, and a rear wall 128 combining to define an open-faced box, where the housing 120 further comprises a plurality of wire attachment terminals 130, at least one female pin socket 140, at least one bussbar 150 electrically coupling an upper set of wire attachment terminals 132 to a lower set of wire attachment terminals 134, and an external securing means 160 allowing the housing secure placement within a recess of a wall.

Preferably, the housing is constructed out of typical non-conductive plastic common in the industry. Additionally, the housing is preferably molded in one piece. The housing is preferably sized as typically seen in the industry, using standard National Electric Code (NEC) dimensions for various sized electrical junction boxes. The present invention allows for a single-gang or multiple-gang housing, depending on the specific application. The housing may further comprise removable sections in any of the pair of side walls, the rear wall, or the top or bottom walls to allow access for external multi-cabled conductors.

As further shown in FIG. 1, the wire attachment terminals 130 are preferably integral to the housing and molded into the non-conductive plastic housing 120. Preferably, the inside of the housing contains molded forward extending shoulder sections 170 along the top and bottom of the housing with the wire attachment terminals 130 preferably located within the recess formed. The molded shoulder sections 170 would preferably be defined by a forward face 172 and a lateral face 174, where the forward face further comprises a pair of holes for each wire attachment terminal. A larger through-hole is structured and arranged to accept a wire attachment fastener, such that the bare wire is coupled to the fastener and the fastener is inserted into the through-hole and threaded into a traditional electrical connector. Alternately preferably, other types of electrical connectors typical in the industry may be used.

Figure 2:
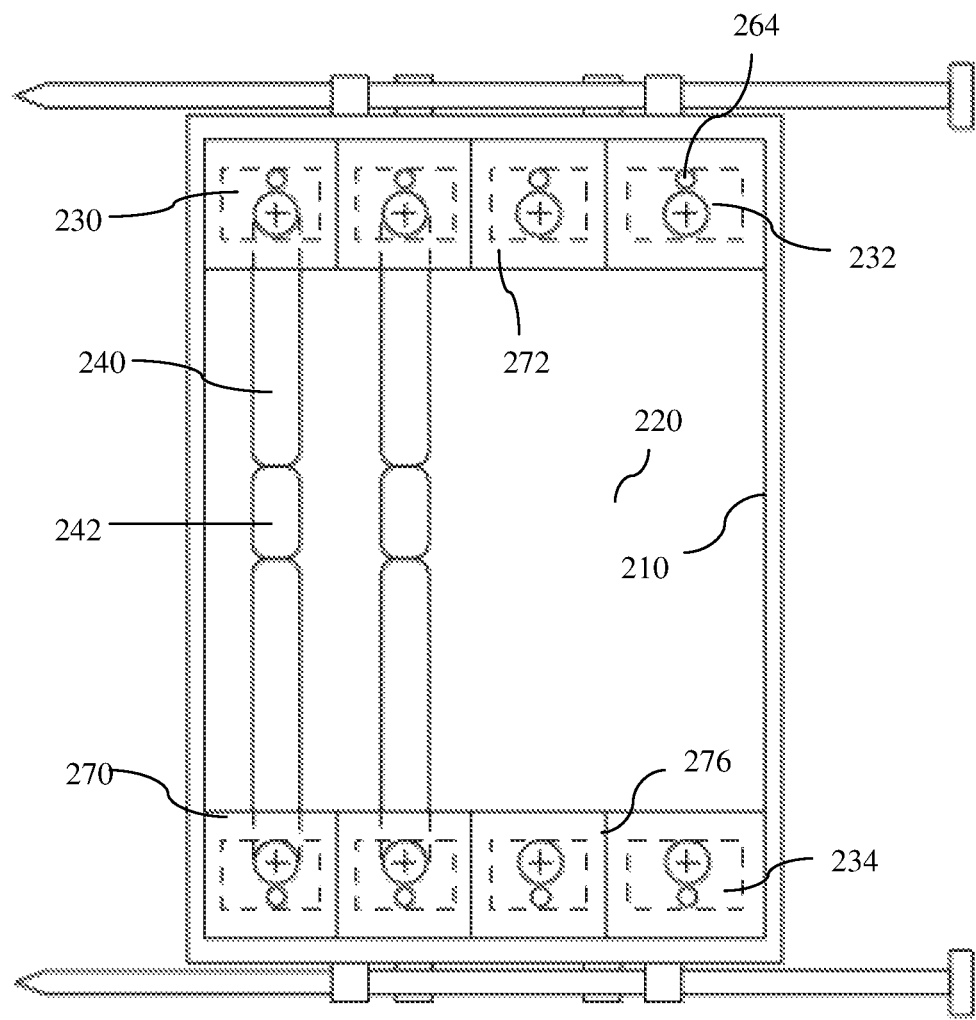
FIG. 2 is a front view for an ELECTRICAL JUNCTION BOX SYSTEM according to an embodiment of the present invention.

As shown in FIG. 2, preferably a series of screw-type wire attachment terminals 230 are located within recesses of the molded shoulder sections 270 and are separated by vertical walls 276 between each wire attachment terminal 230 to electrically isolate each wire attachment terminal from each other. Additionally, at least one female pin socket 264 is preferably located in the molded shoulder section forward face 272 and is preferably structured and arranged to electrically accept the outwardly extending male pins of the electrical device (shown in FIG. 3). The female pin sockets 264 are preferably holes in the forward facing shoulder 272 of the housing with an electrically conducting material lining the inside of the hole. The hole extends toward the back of the housing and the electrically conducting material lining the hole would electrically couple to the corresponding wire attachment terminal 230, thus providing an electrical connection from the wire attachment terminal to the electrical device without the mess of wires to be shoved into the housing.

As further shown in FIG. 2, the present invention would preferably comprise an upper set 232 of wire attachment terminals and a lower set of wire attachment terminals 234, where the upper set of wire attachment terminals is spaced apart from the lower set of wire attachment terminals. Preferably, the upper set of wire attachment terminals 232 would be located along the top inside corner of the rear wall of the housing 220 and the lower set of wire attachment terminals 234 would be located along the bottom inside corner of the rear wall of the housing 210. Preferably, the molded shoulder sections will span the width of the housing and separate the individual wire attachment terminals into electrically separate compartments with vertical walls 236.

As further shown in FIG. 2, at least one bussbar 240 would preferably electrically couple one upper wire attachment terminal to a corresponding lower wire attachment terminal where a common electrical line is desired. For example, one internal bussbar 240 would connect the "neutral" upper wire attachment terminal to the "neutral" lower wire attachment terminal. Likewise, a line 1 (L1) upper wire attachment terminal would have a bussbar connecting it to a line 2 (L2) lower wire attachment terminal such that a common electrical line would be used for an electrical device.

As further shown in FIG. 2, the bussbar 240 preferably further comprises a jumper section 242 located approximately midway between the upper wire attachment terminal and the lower wire attachment terminal. The jumper section 242 is preferably removable such that the circuits in the electrical junction box may be customized depending on the type of electrical connection desired and the type of electrical device to be installed onto the housing. Preferably, the bussbar 240 is encased within a molded plastic portion of the housing with an access opening to the jumper section.

As further shown in FIG. 2, the at least one jumper section 242 is preferably structured and arranged to be removed from the bussbar 240 and breaking the electrical connection between the upper wire attachment terminal and the lower wire attachment terminal. The bussbar jumper sections 242 are preferably structured and arranged to be removed by twisting and breaking along pre-cut, or pre-scored lines, from the bussbar. Alternately preferably, the jumper sections can be removed by clipping along pre-scored lines on the electrical bussbar and removing the jumper sections. Other methods for structuring the jumper sections to be removed not enumerated herein may be considered.

The bussbar 240 is preferably further comprised of a metal bar capable of carrying an electrical current. Metals commonly used for electrical bussbars include, but are not limited to, copper, brass, or aluminum. However, other metals not enumerated herein may be used. Preferably, the at least one bussbar is electrically coupled to the wire attachment terminal via typical electrical connections, such as soldering, or mechanical electrical connections such as bolts, screws, or rivets. However, other methods, not enumerated herein, may be used for electrically coupling the electrical bussbar to the wire attachment terminal without limitation.

Figure 3:
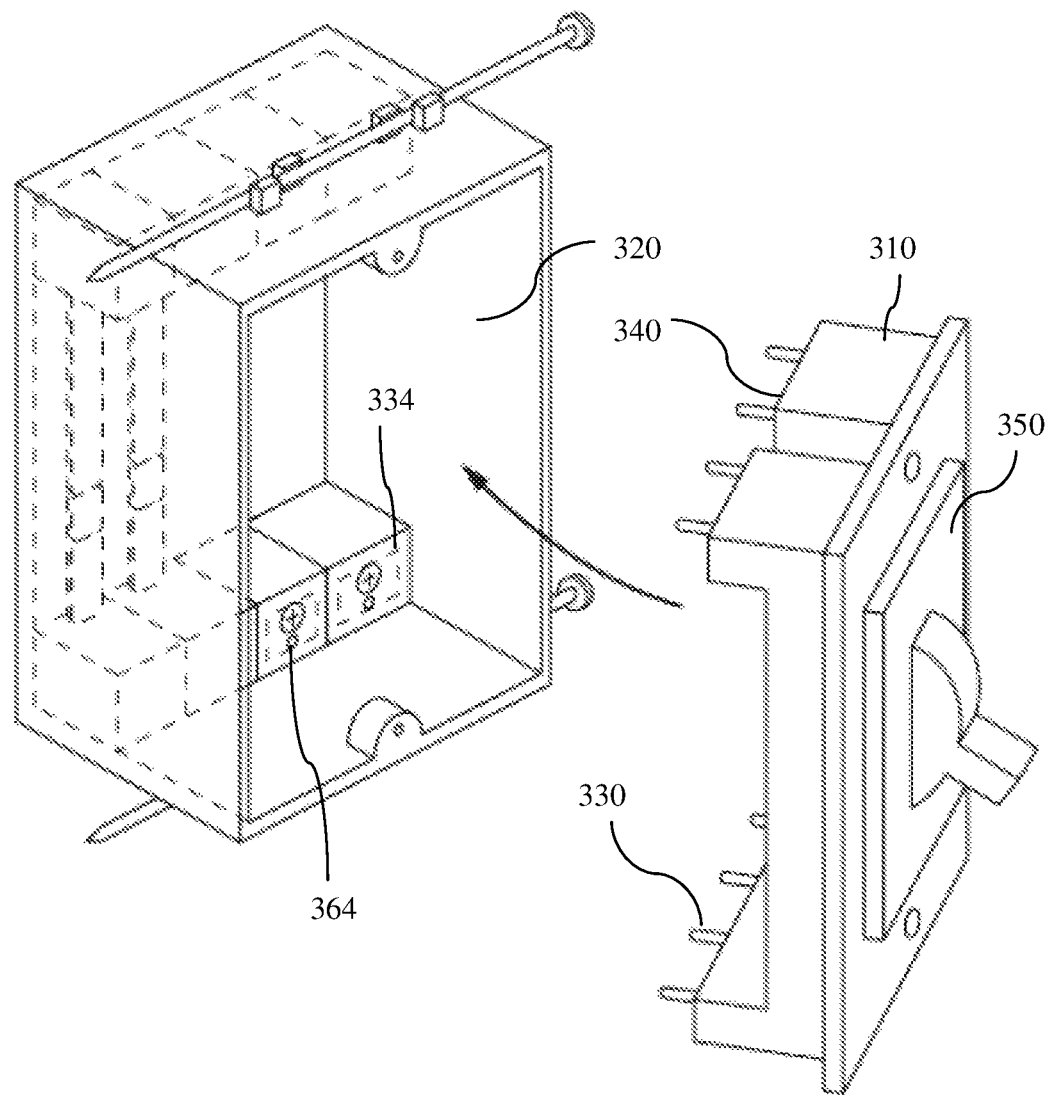
FIG. 3 is a top view for an ELECTRICAL JUNCTION BOX SYSTEM according to an embodiment of the present invention.

As shown in FIG. 3, the electrical junction box system further comprises an electrical device 310 is preferably structured to removably electrically attach to the housing 320, the electrical device further comprising at least one male pin 330 extending outward from an inside surface 340, and an electrical activation means 350 located on an outside surface. The electrical device 310 would preferably be the type commonly on the market today.

As further shown in FIG. 3, the electrical device 310 is structured and arranged to mate with, and electrically couple to the housing 320. The electrical device 310 preferably further comprises an electrical activation means 350. The electrical device 310 preferably further comprises at least one outwardly extending male pin 330 structured and arranged to align and insert into corresponding female pin sockets 364 located in the front face 334 of the molded shoulder sections and provide an electrical connection from the housing to the electrical device. The electrical device 310 is formed to fit within the standard sized electrical junction box housing and further comprises a securing means to fasten the electrical device to the housing. Preferably, the securing means will be the standard fasteners existing in the industry that secure an electrical device to an electrical junction box.

As further shown in FIG. 3, the electrical activation means 330 on the electrical device 310 may be at least one ON/OFF switch 340. Alternately preferably, the electrical activation means 330 on the electrical device 310 may be a plug-in receptacle for receiving an electrical connection to an appliance. Alternately preferably, the plug-in receptacle further comprises a Ground Fault Interrupt Circuit.

Figure 4:
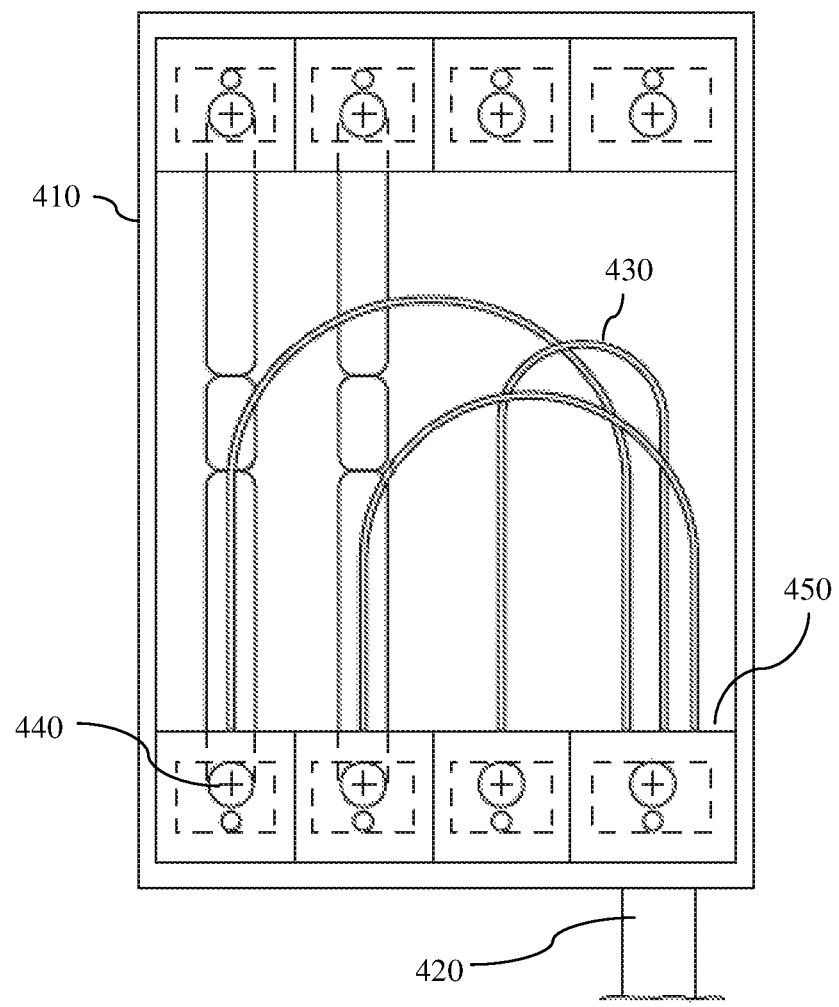
FIG. 4 is side top view for an ELECTRICAL JUNCTION BOX SYSTEM according to an embodiment of the present invention.

As shown in FIG. 4, the electrical junction box system of the present invention is preferably very easy to wire. The incoming multi-cabled conductor 420 and the individual cables 430 are inserted through an opening in one of the sides of the housing 410, then are separated and the external sheathing stripped to show the bare wire. The bare wire is preferably inserted into an opening in the lateral face of the molded shoulder sections 450 and secured to a fastener 440. The fastener is then removably coupled to a pinch bar providing an electrical connection. There are several ways the stripped wire can be attached, including, but not limited to, attaching the stripped wire directly to the fastener, either by wrapping the wire around the fastener or inserting the wire into a hole in the fastener, attaching a connecting lug to the stripped wire and coupling the connecting lug to the terminal, or inserting the wire directly into the wire attachment terminal.

Figure 5:
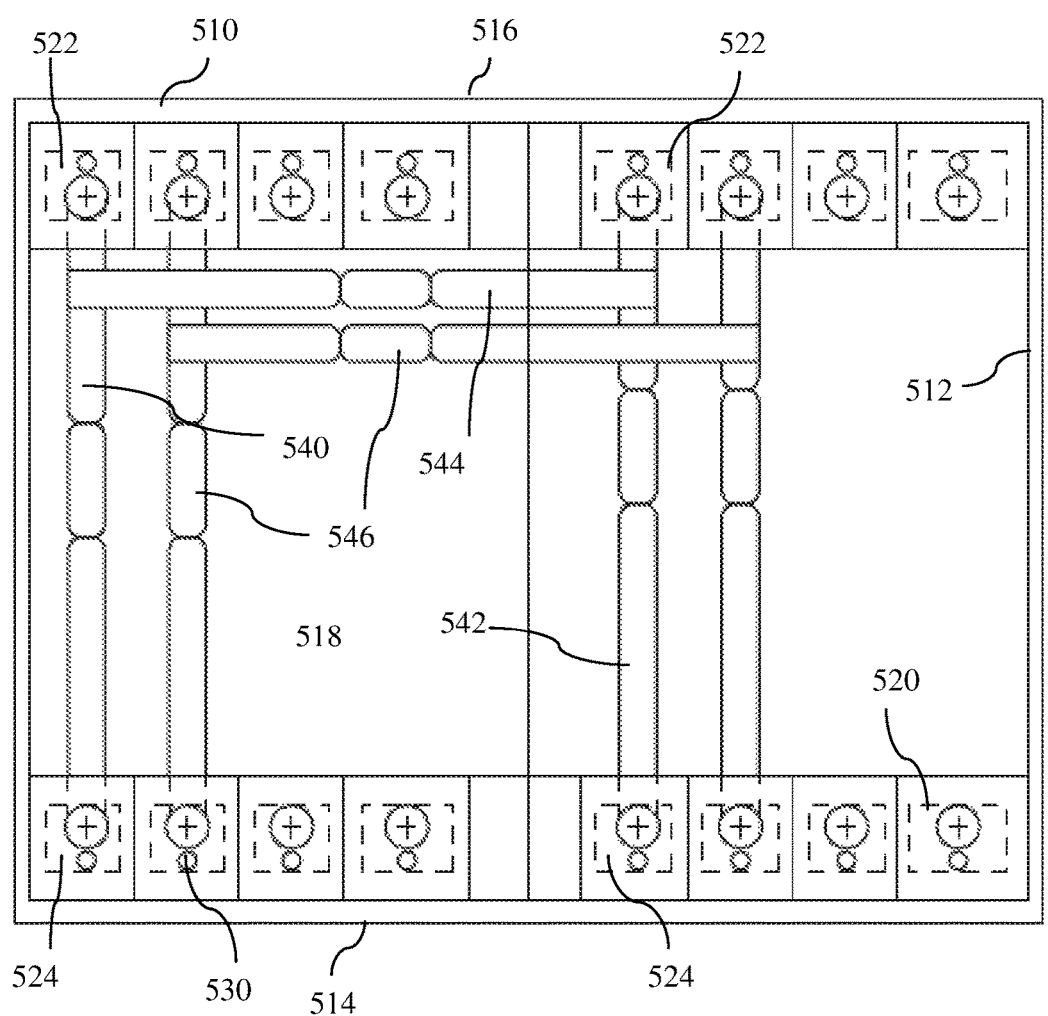
FIG. 5 is a front view illustrating a multiple-gang electrical junction box for an ELECTRICAL JUNCTION BOX SYSTEM according to an alternate embodiment of the present invention.

As shown in FIG. 5, in an alternate embodiment, an electrical junction box system comprising a housing 510 formed by a pair of side walls 512, a bottom wall 514, a top wall 516, and a rear wall 518 combining to define an open face box; said housing 510 further comprising a plurality of wire attachment terminals 520; at least one female pin socket 530 at least one first bussbar 540 electrically connecting at least one upper wire attachment terminal 522 to a corresponding at least one lower wire attachment terminal 524; at least one second bussbar 542 electrically connecting a second upper wire attachment 522 terminal to a second corresponding lower wire attachment terminal 524; at least one third bussbar 544 electrically connecting said first bussbar 540 to said second bussbar 542; and an external securing means allowing said housing 500 secure placement within a recess of a wall.

Additionally, as per described above in the preferred embodiment above, the alternate embodiment further comprises an electrical device structured to removably electrically attach to the housing, the electrical device further comprising at least one male pin extending outward from an inside surface, and an electrical activation means located on an outside surface. The electrical device preferably further comprises multiple switches and is of the type commonly on the market today. For example, 3-way and 4-way switches, dimmer switches, and multiple outlet receptacles would be used in a multi gang electrical junction box.

As further shown in FIG. 5, the multi-gang electrical junction box typically is provided for electrical connections requiring multiple circuits, such as, but not limited to, 3-way and 4-way switches, dimmer switches and multiple electrical receptacles. The electrical bussbars in the multi-gang electrical junction box would preferably electrically connect similar feeds from one switch to a second switch. In addition, the "ground" connection from one gang to a second and/or third gang will preferably further comprise a specific bussbar with no removable jumper sections 546. This specific "ground" electrical bussbar will preferably electrically couple all of the "ground" circuits to each other within the multi gang electrical junction box As further shown in FIG. 5, the at least one wire attachment terminal 520 and at least one female pin socket 530 are structured and arranged as per the single gang electrical junction box described above and shown in FIGS. 1-4. However, in the multi gang electrical junction box, the wire attachment terminal sections are repeated for each additional gang in the housing 510. Additionally, the multi gang electrical junction box comprises the same structure of the single gang electrical junction box described above, however, there are additional elements repeated for each additional gang.

As further shown in FIG. 5, additional electrical bussbars 544 preferably electrically couple the Line (L1, L2, etc) from the electrical bussbar 540 of one gang to an electrical bussbar of a second gang 542, and in other alternate embodiments, to additional electrical bussbars in the additional gangs as is appropriate for the specific electrical junction box used. For example, in a 4 gang electrical junction box, a single electrical bussbar would preferably electrically connect the L1-L2 electrical bussbar of the first gang to the L1-L2 electrical bussbar of the second gang then onto the L1-L2 electrical bussbar of the third gang and the L1-L2 electrical bussbar of the fourth gang. There would preferably be a removable jumper section located on the electrical bussbar between each of the gangs such that if 2 of the four gangs wish to be on one circuit, then the jumper section between gang two and gang three would be removed.

Additionally, the ground circuits across all of the gangs would be preferably electrically coupled to each other using a single electrical bussbar integral to the housing. Further, the ground circuit bussbar would preferably not include the removable jumpers. However, all of the other electrical bussbars present in the multiple gang electrical junction box, besides the "ground" electrical bussbar, would preferably comprise the removable jumpers.

The present invention may be provided in other modified forms without departing from the spirit and scope of the invention. The foregoing description is provided to illustrate one embodiment of the present invention for purposes of this disclosure and it is intended to cover all changes and modifications which do not depart from the spirit and scope of this invention.

I claim:

1. An electrical junction box system comprising:
   a housing formed by a pair of side walls, a bottom wall, a top wall, and a rear wall combining to define an open-faced box configured for attachment of a plurality of electrical bussbars; said housing further comprising:
   a plurality of wire attachment terminals;
   at least one female pin socket;
   at least one first bussbar of said plurality of electrical bussbars electrically coupling at least one upper wire attachment terminal to a corresponding at least one lower wire attachment terminal, wherein said at least one first bussbar of said plurality of electrical bussbars further comprises at least one jumper section structured and arranged to be broken out along a plurality of pre-scored lines;
   at least one second bussbar of said plurality of electrical bussbars electrically coupling at least one upper wire attachment terminal to a corresponding at least one lower wire attachment terminal;
   at least one third electrical bussbar electrically coupling said at least one first bussbar to said at least one second bussbar of a ground circuit is a solid bussbar with no jumper section; and
   an external securing means allowing said housing secure placement within a recess of a wall.

2. The electrical junction box system of claim 1, further comprising an electrical device structured to removable electrically attach to said housing, said electrical device further comprising:
   at least one male pin extending outward from an inside surface; and
   an electrical activation means located on an outside surface.

3. The electrical junction box system of claim 1, wherein said plurality of electrical bussbars are integral to said housing.

4. The electrical junction box system of claim 1, wherein said plurality of wire attachment terminals is integral to said housing.

5. The electrical junction box system of claim 1, wherein said plurality of wire attachment terminals further comprise a pinch bar, wherein a fastener removably attaches a bare wire by electrically securing said bare wire to said pinch bar.

6. The electrical junction box system of claim 1, wherein said housing further comprises openings in said rear wall for receiving external wires for engagement to said plurality of wire attachment terminals.

7. The electrical junction box system of claim 1, wherein said electrical activation means on said electrical device is at least one ON/OFF switch.

8. The electrical junction box system of claim 1, wherein said electrical activation means on said electrical device is a plug-in receptacle for receiving an electrical connection to an appliance.

9. The electrical junction box system of claim 8, wherein said plug-in receptacle further comprises a Ground Fault Interrupt Circuit.

10. An electrical junction box system comprising:
a multi-gang electrical box housing formed by a pair of side walls, a bottom wall, a top wall, and a rear wall combining to define an open face box configured for attachment of a plurality of electrical bussbars; said housing further comprising:
a plurality of wire attachment terminals;
at least one female pin socket;
at least one first bussbar of said plurality of electrical bussbars electrically connecting at least one upper wire attachment terminal to a corresponding at least one lower wire attachment terminal in a first switch circuit;
at least one second bussbar of said plurality of electrical bussbars electrically connecting a second upper wire attachment terminal to a second corresponding lower wire attachment terminal in a second switch circuit;
at least one third bussbar of said plurality of electrical bussbars electrically connecting said first bussbar to said second bussbar;
wherein at least one of said plurality of electrical bussbars further comprises at least one jumper section structured and arranged to be broken out along a plurality of pre-scored lines; and
an external securing means allowing said housing secure placement within a recess of a wall.

11. The electrical junction box system of claim 10, further comprising an electrical device structured to removable electrically attach to said housing, said electrical device further comprising:
at least one male pin extending outward from an inside surface; and
an electrical activation means located on an outside surface.

12. The electrical junction box system of claim 10, wherein said plurality of wire attachment terminals is integral to said housing.

13. The electrical junction box system of claim 10, wherein said housing further comprises openings in said rear wall for receiving external wires for engagement to said plurality of wire attachment terminals.

14. The electrical junction box system of claim 10, wherein said electrical activation means on said electrical device is at least one ON/OFF switch.

15. The electrical junction box system of claim 10, wherein said electrical activation means on said electrical device is a plug-in receptacle for receiving an electrical connection to an appliance.

16. The electrical junction box system of claim 15, wherein said plug-in receptacle further comprises a Ground Fault Interrupt Circuit.

* * * * *